United States Patent [19]
Wadell

[11] Patent Number: 5,236,502
[45] Date of Patent: Aug. 17, 1993

[54] APPARATUS FOR COATING FOODSTUFFS

[75] Inventor: Lars G. A. Wadell, Aengelholm, Sweden

[73] Assignee: Nestec S.A., Vevey, Switzerland

[21] Appl. No.: 701,212

[22] Filed: May 16, 1991

[30] Foreign Application Priority Data

Jun. 21, 1990 [EP] European Pat. Off. ........... 90111752

[51] Int. Cl.$^5$ .............................................. B05C 19/00
[52] U.S. Cl. ........................................ 118/24; 118/13; 118/308; 118/312; 99/494; 198/613
[58] Field of Search .................... 118/13, 16, 24, 308, 118/312; 99/494; 198/580, 613

[56] References Cited

U.S. PATENT DOCUMENTS

| | | | |
|---|---|---|---|
| 974,680 | 11/1910 | Leask | 196/613 |
| 2,701,634 | 2/1955 | Carroll | 198/613 |
| 3,045,640 | 7/1962 | Hill et al. | |
| 3,759,218 | 9/1973 | Korstvedt | 118/24 |
| 3,885,519 | 5/1975 | Orlowski | |
| 4,058,083 | 11/1977 | Miller | 118/16 |
| 4,497,244 | 2/1985 | Koppens | |
| 4,539,801 | 9/1985 | Field | 198/613 |
| 4,662,306 | 5/1987 | Miller | 118/24 |
| 4,762,083 | 8/1988 | Wadell | |
| 5,021,159 | 6/1991 | Bliss et al. | 162/55 |

Primary Examiner—W. Gary Jones
Assistant Examiner—Todd J. Burns
Attorney, Agent, or Firm—Vogt & O'Donnell

[57] ABSTRACT

An apparatus for coating a foodstuff with a particulate material has an endless meshed conveyor belt which is trained about a hollowed roller which has a longitudinally extending wall having apertures therethrough and about which the belt travels from a lower return run to an upper forward run. A baffle is positioned beneath at least a portion of the lower return run of the belt and is arced from the lower return belt run towards the upper forward belt run. A rotatable shaft from which radial wings protrude is positioned within the hollowed roller interior. Meshes of the belt, the apertures of the roller, and the wings are configured and positioned and the wings protrude from the shaft for a length sufficient so that, in operation, upon rotation of the roller and entrainment of the belt and rotation of the shaft and wings, meshes of the belt align with apertures of the roller, and wings align with the aligned roller apertures and belt meshes for at least a portion of a region of the roller about which the belt is trained and extend through the aligned roller apertures and belt meshes towards the baffle.

8 Claims, 1 Drawing Sheet

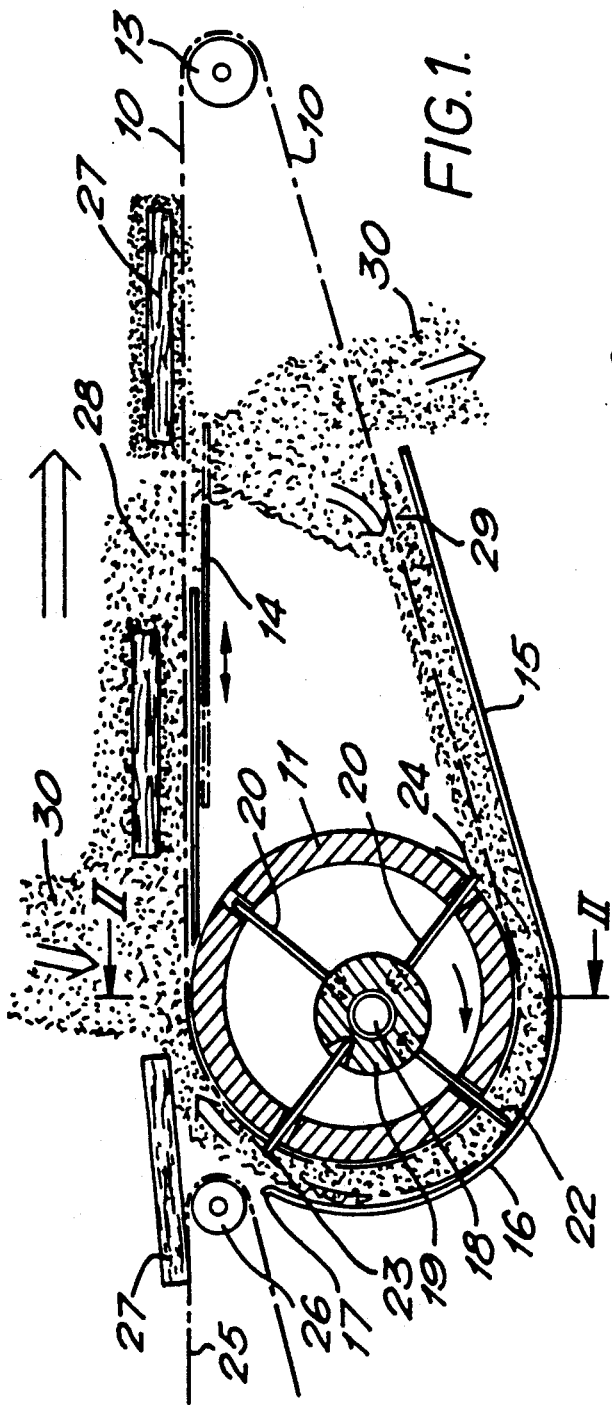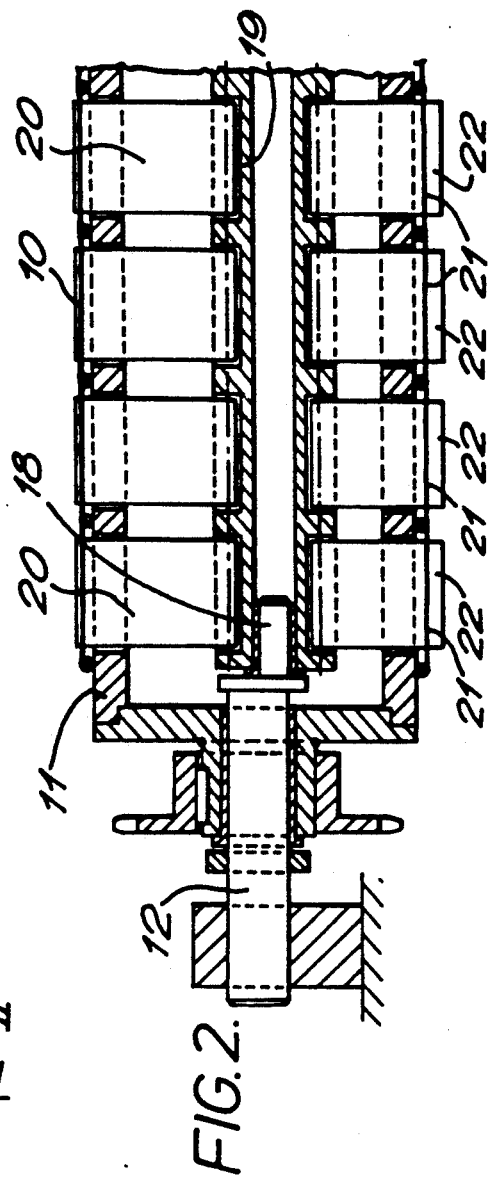

APPARATUS FOR COATING FOODSTUFFS

BACKGROUND OF THE INVENTION

The present invention relates to an apparatus and method of coating a foodstuff with a particulate material.

Normally, during the coating of foodstuffs on a conveyor belt with particulate material, large amounts of coating material fall off the foodstuff during the coating process and it is important that this excess coating material is reused. In conventional equipment used, for example, in coating frozen fish on both sides with breadcrumbs, excess coating material is normally transported upwards for reuse by means of elevator screws. However, not only are delicate crumbs damaged by screws, but also large amounts of coating material are always in circulation and exposed to the warm air of the environment, which is not desirable since it it important that the coating material should be maintained at as low a temperature as possible. In addition, in the coating of some products using conveyor belts, e.g., ice cream with crumbs, it is desirable to adjust the thickness of the upper and lower layer independently, and even nowadays, coating of certain products with particulate material is carried out manually.

One common method of recirculating excess particulate coating material which falls off the foodstuff during coating on a conveyor belt involves the use of a fixed baffle plate positioned below the lower run of the belt transporting the foodstuff and which extends around and is spaced from the belt trained around the roller at the infeed end and adapted to collect excess coating material and after it has accumulated to a sufficient thickness to contact the lower run of the belt, the excess material is forced along the plate and guided around the belt trained around the roller at the infeed end to form a layer of coating material on the upper run of the belt. However, with this method it is difficult to obtain an undamaged, sufficiently thick and consistently even layer of particulate coating material on the upper run of the belt.

SUMMARY OF THE INVENTION

We have devised a novel infeed end to an endless conveyor belt for coating a foodstuff with particulate material which can give a sufficiently thick and consistently even layer of recirculated particulate material on the upper run of the belt. In addition our novel infeed end involves a more gentle transportation of the particulate material so that less damage occurs and, if desired, more delicate particulate material can be used.

In this invention, the endless conveyor belt is trained about rollers at the infeed end and the outfeed end, and for convenience, these rollers will be referred to as infeed and outfeed rollers respectively.

Accordingly, the present invention provides apparatus for coating a foodstuff with a particulate material comprising an endless wire belt having a forward run and a return run trained about infeed and outfeed rollers, baffle means adapted to collect excess particulate material positioned beneath the return run and extending in an arc around the infeed roller to at least partially surround the return run, and a rotary device comprising a shaft fitted with one or more rows of radial wings positioned at the infeed end, whose axis of rotation is parallel to that of the infeed roller and positioned to enable the radial wings to protrude through apertures in the longitudinally extending wall of the roller, which is hollowed, and through aligned meshes of the wire belt in at least part of the region where the return run of the belt is trained about the infeed roller so as to contact and push excess particulate material towards the infeed end of the forward run.

DETAILED DESCRIPTION OF THE INVENTION

In the apparatus of the present invention, the baffle means may be a plate spaced from the return run of the belt and may extend part of or all the way to the outfeed roller so that one end terminates before, at or beyond the outfeed roller. If the baffle plate terminates before the outfeed roller, it will only collect excess particulate material which falls through the meshes of the wire belt. If the baffle plate terminates beyond the outfeed roller, it may also collect excess particulate material which falls off the edge of the forward run of the belt at the outfeed end.

Advantageously, the outfeed end of the wire belt may be positioned within a drum capable of rotating about a substantially horizontal longitudinal axis as described in European Patent No. 231461, and European Patent Applications Nos. 89114154.1 and 89114174.9. In this case, the baffle plate terminates at a position so that it collects a portion of the excess particulate material while the rest of the excess particulate material is recuperated by the rotating drum and used to apply it to the top of fresh fish pieces as they are transported on the forward run of the wire belt.

The part of the baffle means which extends in an arc around the infeed roller preferably terminates beyond the position where excess particulate material falls off the wire belt by gravity and conveniently terminates upstream of the infeed end, level with or just below the forward run of the wire belt.

The rotary device is preferably fitted with from 2 to 10 and especially from 3 to 6 rows of radial wings. The shaft of the rotary device is eccentrically positioned relative to the infeed roller, in the lateral half whose edge contacts and guides the wire belt. The radial wings are preferably of such a length that they may substantially contact and slide along at least part of the baffle means so that substantially all the excess particulate material collected can be pushed and recirculated to form a layer on the forward run of the wire belt. Preferably, the position of the shaft of the rotary device and the length of the radial wings is such that the radial wings do not protrude substantially through the meshes of the forward.run of the wire belt. Ideally, the radial wings should not protrude through the meshes of the forward run at all but if they do, the amount of protrusion should be less than the thickness of the layer of excess particulate material on the forward run in order not to damage the foodstuff being coated or to obstruct the regular flow of the foodstuff. The width of a row of radial wings is preferably substantially the same as the width of the baffle means. The width of each wing in a row of wings is determined by the width of the wire belt meshes through which the wings protrude. It goes without saying that the direction and speed of rotation of the rotary device is the same as on that of the infeed roller.

The present invention also provides a process for coating a foodstuff with a particulate material which comprises feeding the foodstuff onto the forward run of an endless wire belt, feeding particulate material onto the foodstuff as it is conveyed along the forward run, excess particulate material that falls through the meshes of the wire belt is collected by baffle means positioned beneath the return run of the wire belt and pushed between the baffle means and the wire belt in an arc around the infeed roller towards the infeed end of the forward run, where it forms a layer, by one or more rows of radial wings fitted to the shaft of a rotary device positioned at the infeed end of the belt whose axis of rotation is parallel to that of the infeed roller and positioned to enable the radial wings to protrude through apertures in the longitudinally extending wall of the roller, which is hollowed, and through aligned meshes of the wire belt in at least part of the region where the return run of the wire belt is trained about the infeed roller.

The foodstuff may be any foodstuff which may be coated with particulate material, for example, chocolate, confectionery, ice cream, vegetables, meat or fish. In some cases, before being coated, the foodstuff is conveniently treated to enable the particulate material to adhere to the foodstuff. For example, an adhesive surface may be formed on confectionery articles by heating or the application of a binding agent while fish may be battered. In the case of ice cream, a sticky surface may be formed by infrared or steam heating.

The particulate material may be any kind of crumb, granular or powdery material, such as bread or confectionery crumbs, nut splinters, flour, starch, nuts, raisins, sugar crystals, shredded cheese, or particulate material from dehydrated potato, for example, potato flakes, potato powder or potato granules.

The present invention is further illustrated by way of example only with reference to the accompanying drawings.

BRIEF DESCRIPTION OF THE DRAWINGS

FIG. 1 is a sectional side view of the apparatus.

FIG. 2 is a cross-sectional view of the apparatus shown in FIG. 1 taken substantially along the line II—II thereof, looking in the direction of the arrows.

DETAILED DESCRIPTION OF THE DRAWINGS

Referring to the drawings, the apparatus comprises an endless wire belt 10 trained around an infeed roller 11 on a shaft 12 and an outfeed roller 13. As illustrated in FIGS. 1 and 2, roller 11 is hollowed and has a longitudinally extending wall having apertures therethrough. Positioned beneath the forward run of the belt 10 is an adjustable plate 14, and positioned beneath and spaced from the return run of the belt 10 is a fixed baffle plate 15 which extends in an arc 16 around the infeed roller 11 to terminate at a position 17 upstream of the infeed end of the belt 10. Positioned within the hollow of roller 11 on a rotary shaft 18 is a rotary device 19 provided with four rows of four radial wings 20 having length sufficient to protrude through apertures in the longitudinally extending wall of roller 11 and between the aligned meshes 21 of the wire belt 10 in the positions shown at 22, 23 and 24.

The outfeed end of a feed belt 25, trained around a roller 26, feeds fish pieces 27 onto a layer of bread crumbs 28 lying on the wire belt 10. Bread crumbs which fall through the meshes of the wire belt are split into portion 29, which is collected on the baffle plate 15, and portion 30, which is recirculated to fall on top of the fish pieces.

In operation, the fish pieces 27 fed from belt 25 are transported along the forward run of belt 10 where they lie on a layer of bread crumbs 28. The adjustable plate 14 determines the distance the product is covered in crumbs from and prevents any excess crumbs falling through the meshes of the wire belt, but beyond the edge of the adjustable plate, excess crumbs 28 fall through the meshes of the wire belt through both the forward run and the return run where a portion 29 is collected on the fixed plate 15. As the rotary device 19 rotates with the infeed roller 11, the radial wings 20 protrude through the meshes 21 of the return run of the wire belt at positions 22, 23 and 24 and push the excess crumbs 29 upwards and around the infeed roller so that they form a layer on the forward run of the wire belt 10.

Therefore, as described above and as shown in the drawing Figures and in operation, wings 20 and the apertures of roller 11 and meshes of belt 10 are configured and positioned and the wings 20 extend for a length sufficient from shaft 18, which has a longitudinally extending axis which is parallel with a longitudinal axis of the longitudinally extending roller wall so that upon rotation of the roller 11 and entrainment of belt 10 and rotation of shaft 18 and wings 20, meshes of belt 10 align with apertures of roller 11, and wings 20 align with the aligned roller apertures and belt meshes for at least a portion of a region of the roller about which the belt is trained and extend through the aligned roller apertures and belt meshes towards baffle plate 15.

The portion of the excess bread crumbs 30 is recirculated by falling onto the lower part of the inside wall of a drum capable of rotating about a substantially horizontal longitudinal axis, as described In European Patent No. 231461, and European Patent Applications Nos. 89114154.1 and 89114174.9, from where it travels upwards on the inside wall until it reaches a position where it falls by gravity, e.g., onto a conveyor, and is used to apply to the top of fresh fish pieces as they are transported on wire belt 10.

The fish pieces which are coated on all sides are transported from the outfeed end of the belt 10 for subsequent processing.

I claim:

1. In an apparatus for coating a foodstuff having an endless meshed conveyor belt trained about a roller about which the belt travels from a lower return run to an upper forward run and having a baffle means which is positioned beneath at least a portion of the return run and which is arced from the return run towards the forward run, the improvements comprising:

a roller which has a longitudinally extending wall which defines a hollowed roller interior and which has apertures therethrough and about which the belt is trained for being directed from the return run to the forward run;

a rotatable shaft which is positioned within the hollowed roller interior and which has a longitudinally extending axis parallel with a longitudinal axis of the longitudinally extending roller wall; and wings positioned to protrude radially from the shaft wherein meshes of the belt, the roller apertures and the wings are configured and positioned and wherein the wings protrude from the shaft for a length sufficient so that, in operation, upon rotation of the roller and entrainment of the belt and rotation of the shaft and wings, meshes of the belt align with apertures of the roller, and wings align with the aligned roller apertures and belt meshes for at least a portion of a region of the roller about which the belt is trained and the wings extend through the aligned roller apertures and belt meshes towards the baffle means.

2. An apparatus according to claim 1 wherein the shaft is eccentrically positioned within the hollowed roller interior.

3. An apparatus according to claim 1 wherein the wings protrude from the shaft for a length so that the wings contact and slide along at least a part of the baffle means.

4. An apparatus according to claim 1 wherein the wings are configured and positioned to encompass a width of the baffle means which extends beneath the longitudinally extending wall of the roller.

5. An apparatus according to claim 1 wherein the shaft is eccentrically positioned within the hollowed roller interior and wherein the wings protrude from the shaft for a length so that the wings contact and slide along at least a part of the baffle means and are configured and positioned to encompass a width of the baffle means which extends beneath the longitudinally extending wall of the roller.

6. An apparatus according to claim 1 wherein the baffle means extends beneath the forward run to collect material falling from the forward run.

7. An apparatus according to claim 1 further comprising a plate positioned beneath at least a portion of the forward run to prevent material on the forward run from falling to the return run.

8. An apparatus according to claim 1 wherein the arc of the baffle means extends towards the upper run to a position sufficient to prevent material falling from the apparatus by gravity.

* * * * *